Feb. 17, 1959     C. M. COOPER     2,874,109
MEANS FOR TERMINATING NUCLEAR REACTIONS
Filed Sept. 20, 1946     3 Sheets-Sheet 1
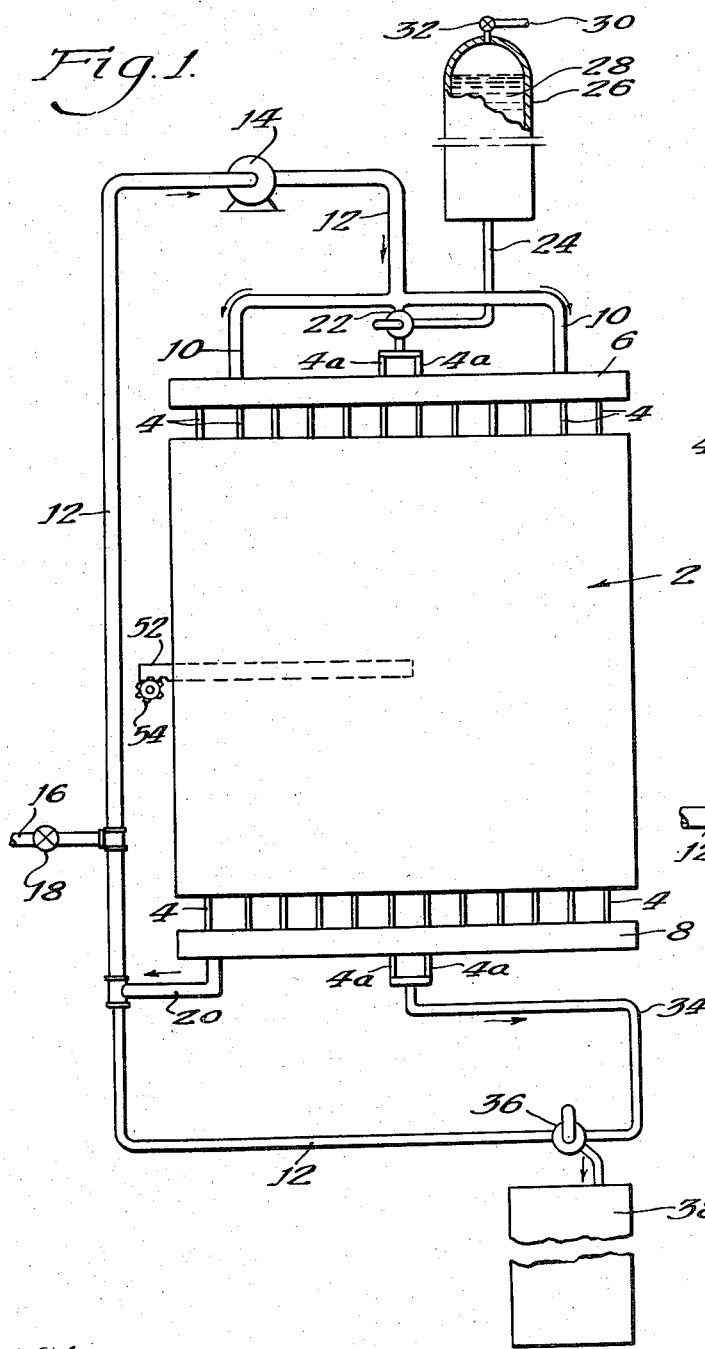
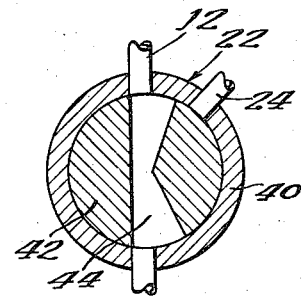
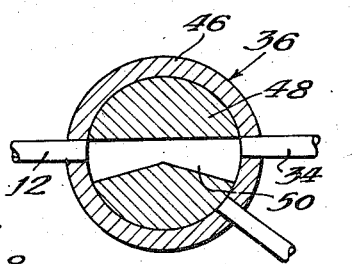
Witness:
Walter J. Schlegel, Jr.
Inventor:
Charles M. Cooper
By: Robert A. Lavender
Attorney

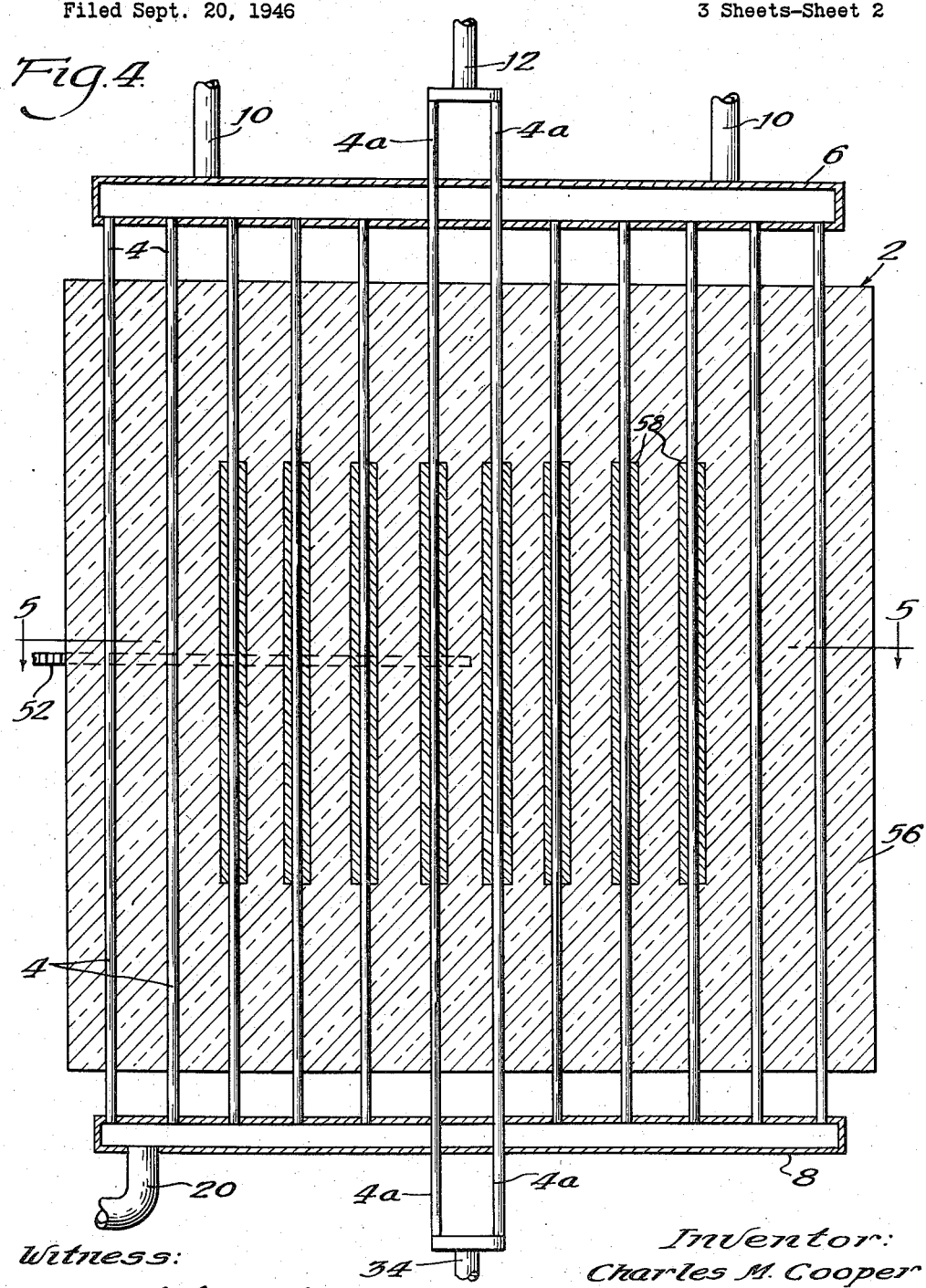

Feb. 17, 1959     C. M. COOPER     2,874,109
MEANS FOR TERMINATING NUCLEAR REACTIONS
Filed Sept. 20, 1946     3 Sheets-Sheet 3

United States Patent Office 2,874,109
Patented Feb. 17, 1959

2,874,109

MEANS FOR TERMINATING NUCLEAR REACTIONS

Charles M. Cooper, Newark, Del., assignor to the United States of America as represented by the United States Atomic Energy Commission Application September 20, 1946, Serial No. 698,336

2 Claims. (Cl. 204—193.2)

This invention relates to nuclear physics and more particularly to a novel method and means for terminating a nuclear fission chain reaction in a structure known as a neutronic reactor or a pile.

In neutronic reactors a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general, such reactors comprise bodies of compositions containing fissionable material such, for example, as natural uranium, disposed in a neutron slowing material which slows the neutrons to thermal energies. Such a slowing material is termed a neutron moderator. Carbon and $D_2O$ (heavy water) are typical moderators suitable for such use. Heat is evolved during the reaction which is removed by passage of a coolant through the reactor or in heat exchange relationship therewith. Specific details of the theory and essential characteristics of such reactors are set forth in the patent of Enrico Fermi and Leo Szilard, 2,708,656, issued May 17, 1955.

In neutronic reactors, the ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size, therefore, differs from K by the external leakage factor, and by a factor due to the neutron absorption by localized neutron absorber, and the reproduction ratio must still be sufficiently greater than unity to permit the neutron density to rise exponentially with time in the system as built.

During the interchange of neutrons in a system of finite size, comprising bodies of any size disposed in a neutron moderator, neutrons may be lost to the chain reaction in four ways: by absorption or capture in the uranium content of the bodies without producing fission; by absorption or capture in the moderator material itself; by absorption or capture by the impurities present in both the uranium bodies and the moderator; and by leakage out of the system through the periphery thereof.

A general object of the invention is to provide a novel method and means for terminating a nuclear fission chain reaction without the use of complicated mechanical devices, such as safety rods, which are commonly used in the art.

A more specific object of the invention is to provide a novel method and means for terminating a chain reaction within a fluid cooled reactor by substituting for at least a portion of the coolant fluid another coolant fluid having a relatively great neutron capture cross section such as, for example, a compound of cadmium in solution.

Still another object of the invention is to design a neutronic reactor, such as above described, wherein the reactive composition comprises a mass of neutron moderator with fissionable material dispersed therethrough and conduits conveying fluid coolant passing through the reactor in heat exchange relationship with the fissionable material, means being provided for introducing into certain of said conduits a poisoning fluid having a relatively great neutron capture cross section.

The foregoing and other objects and advantages of the invention will become apparent from a consideration of the following specification and the accompanying drawings, wherein:

Fig. 1 is a flow diagram of a neutronic reaction system embodying the invention;

Fig. 2 is a vertical section through the inlet selector valve shown in Fig. 1;

Fig. 3 is a vertical section through the outlet selector valve shown in Fig. 1;

Fig. 4 is an enlarged central vertical section through the neutronic reactor shown in Fig. 1.

Figure 5:
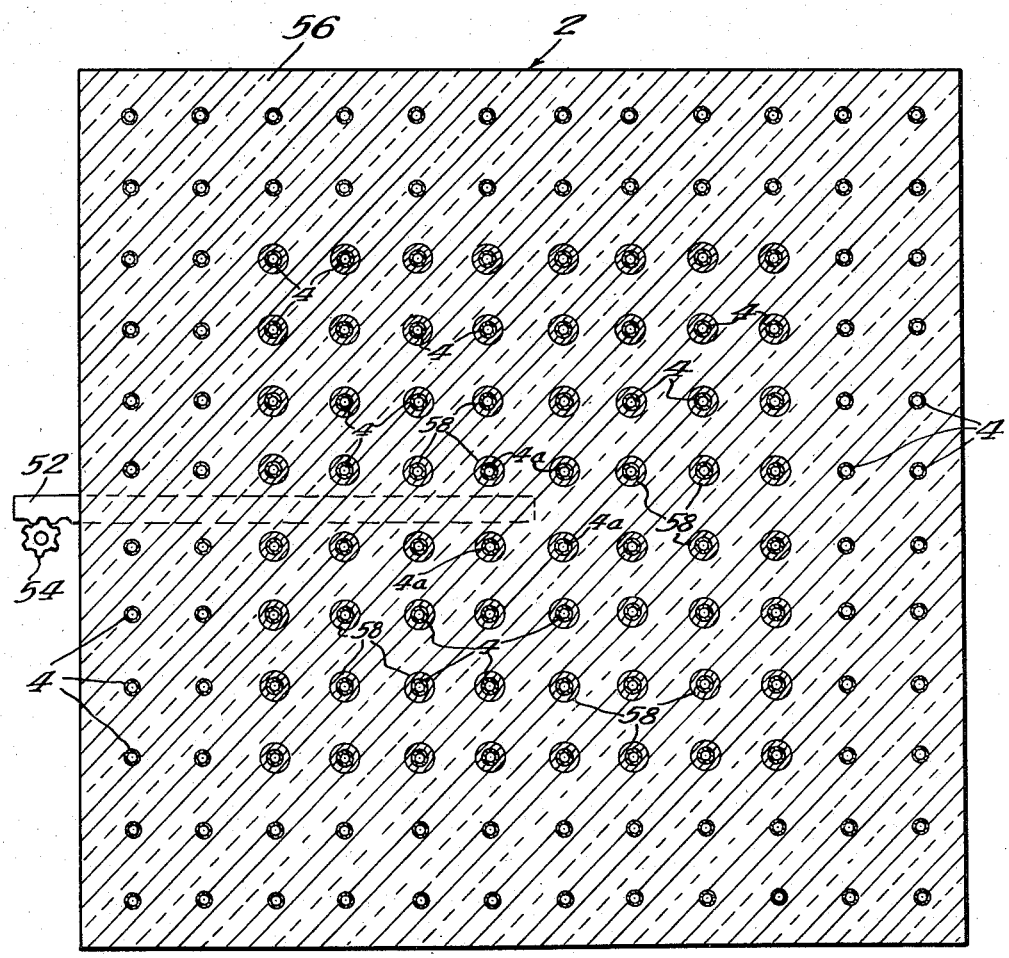
Fig. 5 is a horizontal sectional view taken in the plane indicated by the line 5—5 of Fig. 4.

Describing the invention in detail and referring first to Figs. 1 to 3, the novel system comprises a neutronic reactor generally designated 2, and hereinafter more particularly described.

A plurality of coolant tubes 4 extend through the reactor 2 and are connected at their upper extremity to an inlet header tank 6 and at their lower extremity to an outlet header tank 8. The inlet header tank 6 is connected to branch lines 10 of an inlet line 12 comprising a conventional pump 14, the suction side of which is connected through the line 12 to a make-up line 16 containing a conventional shut-off valve 18. The line 16 is connected to a source (not shown), of any suitable coolant, such as ordinary water, helium, or molten bismuth.

The outlet header tank 8 is connected by a discharge line 20 to the before-mentioned line 12 at the suction side of the pump 14 to complete a closed circuit through the reactor 2.

The tubes or conduits 4a centrally disposed in the reactor are connected at their upper extremity to the inlet line 12 through an inlet selector valve 22, which is also connected to a pipe or line 24 communicating with a tank or accumulator 26. This tank 26 is adapted to hold a body of poisoning fluid 28 (i. e., a fluid having a high capture cross-section for neutrons) and a body of compressed gas, such as air or helium, admitted to the top of the tank 26 through a line 30 having a conventional shut-off valve 32 therein. It will be understood that the line 30 is connected to a conventional compressor (not shown), whereby the gas within the top of the chamber 26 is compressed to any desired predetermined value, thereby exerting a predetermined pressure on the poisoning fluid 28 therein. It may be noted that the poisoning fluid 28 is any suitable liquid, such as a compound of cadmium in solution, having a relatively great neutron capture cross section, whereby the introduction of the poisoning fluid 28 into the central coolant tubes or conduits 4a is effective to reduce the reproduction ratio below unity so as to immediately terminate the nuclear fission chain reaction within the reactor 2.

The lower extremities of the tubes 4a are connected to an outlet line 34 which is connected to an outlet selector valve 36. The valve 36 is connected to the before-mentioned line 12 and to a tank or reservoir 38 serving a purpose hereinafter described.

Referring now to Figs. 2 and 3, it may be noted that the inlet selector valve 22 may be of any conventional form, and is illustrated as comprising a cylindrical body or casing 40 with a cylinder valve member 42 rotatably fitted therein. The valve member 42 is provided with a passage 44 therethrough whereby, as may be clearly seen in Fig. 2, the valve member may be rotated so that the lines 12 and 24 are selectively connected to the conduits 4a. The outlet selector valve 36 may be of any desired conventional form and, as illustrated in Fig. 3, comprises a cylindrical body or casing 46 with a cylindrical valve member 48 rotatably fitted therein. The valve member 48 comprises a passage 50 therethrough, whereby said valve member may be rotated to connect the outlet line 34 to either the line 12 or reservoir 38.

During normal operation of the system, heat produced by the nuclear fission chain reaction within the reactor 2 is absorbed and conducted from the reactor structure by means of a coolant, such as water having a relatively small neutron capture cross section, said coolant being pumped through the tubes 4 and 4a by means of the before-mentioned pump 14. Under these conditions, the valves 22 and 36 are in the positions illustrated in Figs. 2 and 3, respectively, whereby the tubes 4a are connected at their upper extremities to the coolant inlet line 12 through the valve 22. The outlet line 34, which is connected to the lower extremities of the tubes 4a, is connected, under these conditions, to the line 12 through the valve 36. Thus, a closed hydraulic circuit is established whereby the coolant is pumped through the tubes 4 and 4a and is conveyed through the outlet lines 20 and 34 to the line 12 at the suction side of the pump 14.

The neutron density within the reactor 2 and consequently the heat developed therewithin are regulated by one or more control rods 52 movable inwardly and outwardly of the reactor within a complementary passage therein by any suitable actuating means, such as a rack and pinion mechanism indicated at 54. The neutron density within the reactor 2 is monitored by any conventional means (not shown).

In the event that it is desirable to quickly terminate the nuclear fission chain reaction, the valve member 42 is rotated within its casing 40 to connect the line 24 to the tubes 4a, and the valve member 48 is rotated to connect the line 34 to the reservoir 38. Thus, the tank 26 is connected to the tubes 4a through the line 24 and the poisoning fluid 28 within the tank is rapidly urged into the tubes 4a by means of the compressed gas acting as a spring in the upper extremity of the tank 26. In this connection, it may be noted that the gas is preferably placed under a pressure of approximately 300 lbs./sq. inch, and a sufficient quantity of poisoning fluid 28 is provided to accommodate a flow of said fluid through the tubes 4a for approximately 15 to 20 minutes. This poisoning fluid is conveyed from the tubes 4a through the outlet line 34 into the beforementioned reservoir 38 so as to avoid poisoning of the coolant within the line 12.

When it is desired to reinitiate the chain reaction, the valve 22 is rotated to its original position in which the line 12 is connected to the tubes 4a. The valve 36 is not returned to its original position, in which the line 34 is connected to the line 12, until the coolant flowing through the tubes 4a has flushed the poisoning fluid therefrom. When this has been accomplished, the valve 36 is then returned to its original position as illustrated in Fig. 3, and the chain reaction is reinitiated.

Referring now to Figs. 4 and 5, it will be seen that the neutronic reactor 2 comprises a mass of neutron moderator 56 such as, for example, blocks of graphite, beryllium, or beryllium oxide of high neutronic purity. The tubes or conduits 4 and 4a extend through the neutron moderator 56, and the tubes 4a, as well as a central group of the tubes 4 extend through complementary passages in uranium members 58 having a natural or enriched isotopic content of fissionable material. As will be clearly understood from a consideration of Figs. 4 and 5, the uranium members 58 are spaced from the top and bottom and from the sides of the cubical moderator mass 56, whereby a neutron reflector is afforded around the central reactive portion of the structure to reduce neutron losses from said reactive portion, as more fully discussed in the above-mentioned copending application.

While the theory of nuclear reactions set forth herein is based on the best presently known experimental evidence, the invention is not limited thereto inasmuch as additional experimental data later discovered may modify the theory disclosed.

What is claimed is:

1. In a system of the class described: means for sustaining a nuclear fission chain reaction comprising neutron moderator, coolant conduits extending therethrough, thermal neutron fissionable material in direct heat exchange relationship with said conduits, an inlet header and an outlet header connected to some of said conduits, coolant-returning means, having an upstream end connected to the outlet header and a downstream end connected to the inlet header, whereby cyclic flow of coolant is obtained, a first valved means connecting the inlet ends of the balance of said conduits to the downstream end of said coolant-returning means, and a second valved means connecting the outlet ends of said balance of said conduits to the upstream end of said coolant-returning means; and means for terminating said reaction comprising a source of a reaction-terminating fluid, means for connecting said source to the first valve means, a reservoir for said reaction-terminating fluid, and means for connecting said reservoir to the second valved means, the first and second valved means being adapted to stop cyclic flow of coolant through said balance of said coolant conduits and to provide for flow of the fluid from the source through said balance of conduits to the reservoir without introducing said fluid into the cycled coolant.

2. The system of claim 1 wherein the moderator is graphite, the thermal neutron fissionable material is uranium, the coolant is water and the reaction-terminating fluid is a solution of a cadmium compound.

References Cited in the file of this patent

UNITED STATES PATENTS

| 1,762,464 | Belfield | June 10, 1930 |

FOREIGN PATENTS

| 114,150 | Australia | May 2, 1940 |
| 861,390 | France | Oct. 28, 1940 |
| 233,011 | Switzerland | Oct. 2, 1944 |

OTHER REFERENCES

Smyth: "A General Account of the Development of Methods of Using Atomic Energy for Military Purposes," August 1946, pages 103, 179, also pages 75, 82, 83, 84, 85, 106, 107.

Kelly et al.: "Physical Review" 73, 1135–9 (1948).